(12) United States Patent
Chiang et al.

(10) Patent No.: US 8,232,978 B2
(45) Date of Patent: Jul. 31, 2012

(54) OPTICAL REFLECTED TOUCH PANEL AND PIXELS AND SYSTEM THEREOF

(75) Inventors: Wen-Jen Chiang, Hsinchu (TW); An-Thung Cho, Hsinchu (TW); Chrong-Jung Lin, Hsinchu (TW); Chia-Tien Peng, Hsinchu (TW); Ya-Chin King, Taipei (TW); Kun-Chih Lin, Hsinchu (TW); Chih-Wei Chao, Hsinchu (TW); Chien-Sen Weng, Hsinchu (TW); Feng-Yuan Gan, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 582 days.

(21) Appl. No.: 12/465,666

(22) Filed: May 14, 2009
(Under 37 CFR 1.47)

(65) Prior Publication Data
US 2009/0289920 A1 Nov. 26, 2009

(30) Foreign Application Priority Data

May 22, 2008 (TW) .............................. 97118972 A

(51) Int. Cl.
G06F 3/042 (2006.01)
G06G 3/36 (2006.01)
G09G 5/00 (2006.01)
(52) U.S. Cl. ..................... 345/175; 345/102; 345/156
(58) Field of Classification Search .................. None
See application file for complete search history.

(56) References Cited

U.S. PATENT DOCUMENTS

| | | |
|---|---|---|
| 5,140,153 A | 8/1992 | Heikkinen et al. |
| 6,518,561 B1 | 2/2003 | Miura |
| 2008/0211787 A1* | 9/2008 | Nakao et al. .................. 345/175 |
| 2008/0231564 A1* | 9/2008 | Harada et al. .................. 345/81 |

* cited by examiner

*Primary Examiner* — Alexander S Beck
*Assistant Examiner* — Kirk Hermann
(74) *Attorney, Agent, or Firm* — Jianq Chyun IP Office

(57) ABSTRACT

An optical reflective touch panel and pixels and a system thereof are provided. Each pixel of the optical reflective touch panel includes a display circuit and a sensing circuit. The display circuit controls the display of the pixel. The sensing circuit is coupled to the display circuit for sensing a sensitization state of the pixel during a turned-on period and a turned-off period of a backlight module and outputting a digital signal to notify an optical reflective touch panel system that whether the pixel is touched or not.

21 Claims, 7 Drawing Sheets

OPTICAL REFLECTED TOUCH PANEL AND PIXELS AND SYSTEM THEREOF

CROSS-REFERENCE TO RELATED APPLICATION

This application claims the priority benefit of Taiwan application serial no. 97118972, filed on May 22, 2008. The entirety the above-mentioned patent application is hereby incorporated by reference herein and made a part of specification.

BACKGROUND OF THE INVENTION

1. Field of the Invention

The present invention generally relates to a touch panel, and more particularly, to an optical reflective touch panel and pixels and a system thereof.

2. Description of Related Art

Touch panel/screen is originated from the conception of electronic touch interface proposed by Dr. Samuel C. Hurst in 1971, and various application products have been developed since the first touch panel was invented in 1974. A user can learn to operate a touch panel quickly because of the direct interface of the touch panel. Along with the development of highly-friendly man-machine interface (MMI), touch panel has been increasingly demanded and broadly applied in different fields.

Existing touch panels can be categorized into resistive touch panel, capacitive touch panel, sound wave touch panel, optical reflective touch panel, and electromagnetic induction touch panel according to the operation principles thereof. Optical reflective touch panel takes up an important place among all the touch panels for it offers unobstructed display screen, excellent transmittance, high reliability, high scratch-resistance, and good fire-proofness, etc.

A conventional optical reflective touch panel senses the incidence of ambient light source through an embedded photosensitive device (for example, a photo diode), so as to allow an optical reflective touch panel system to determine a position touched by a user on the optical reflective touch panel and execute a corresponding operation.

However, the conventional optical reflective touch panel is easily affected by ambient light source (for example, when the optical reflective touch panel is operated in a dim environment), and which may cause the optical reflective touch panel system to operate abnormally or misinterpret the position touched by a user on the optical reflective touch panel and accordingly execute a wrong operation.

SUMMARY OF THE INVENTION

Accordingly, the present invention is directed to an optical reflective touch panel and pixels and a system thereof, wherein the affection of ambient light source to the optical reflective touch panel is completely eliminated so that the optical reflective touch panel system can accurately determine a position touched by a user.

The present invention provides a pixel of an optical reflective touch panel, wherein the pixel includes a display circuit and a sensing circuit. The display circuit controls the display of the pixel. The sensing circuit is coupled to the display circuit for respectively sensing a sensitization state of the pixel during a turned-on period and a turned-off period of a backlight module and outputting a digital signal to notify an optical reflective touch panel system that whether the pixel is touched or not.

According to an embodiment of the present invention, the display circuit includes an active device, a storage capacitor, and a liquid crystal capacitor. The gate of the active device is coupled to an $N^{th}$ scan line, and the source of the active device is coupled to an $N^{th}$ data line, wherein N is a positive integer. One terminal of the storage capacitor is coupled to the drain of the active device, and the other terminal of the storage capacitor is coupled to an $(N+1)^{th}$ scan line. One terminal of the liquid crystal capacitor is coupled to the drain of the active device, and the other terminal of the liquid crystal capacitor is coupled to a common voltage.

According to an embodiment of the present invention, the sensing circuit includes a first transistor, a second transistor, a third transistor, a fourth transistor, a fifth transistor, a sixth transistor, a photosensitive device, a first inverter, and a second inverter. The gate of the first transistor is coupled to the $N^{th}$ scan line for receiving a scan signal, and the first source or drain of the first transistor is coupled to a system voltage. One terminal of the photosensitive device is coupled to the second source or drain of the first transistor and the other terminal of the photosensitive device is coupled to the common voltage.

The gate of the second transistor receives a bias voltage, and the first source or drain of the second transistor is coupled to the common voltage. The gate of the third transistor is coupled to the second source or drain of the first transistor, the first source or drain of the third transistor receives a first sensing signal, and the second source or drain of the third transistor is coupled to the second source or drain of the second transistor. The input terminal of the first inverter is coupled to the second source or drain of the third transistor.

The gate of the fourth transistor receives a second sensing signal, and the first source or drain of the fourth transistor is coupled to the output terminal of the first inverter. The gate of the fifth transistor is coupled to the output terminal of the first inverter, and the first source or drain of the fifth transistor outputs the digital signal to the $N^{th}$ readout line. The input terminal of the second inverter is coupled to the second source or drain of the fifth transistor, and the output terminal of the second inverter is coupled to the second source or drain of the fourth transistor. The gate of the sixth transistor is coupled to the output terminal of the second inverter, the first source or drain of the sixth transistor is coupled to the input terminal of the second inverter, and the second source or drain of the sixth transistor is coupled to the common voltage.

According to an embodiment of the present invention, the first transistor, the second transistor, the fourth transistor, and the sixth transistor are NMOS transistors, while the third transistor and the fifth transistor are PMOS transistors.

According to an embodiment of the present invention, the scan signal and the first sensing signal are respectively enabled once during the turned-on period and the turned-off period of the backlight module, and the enabled period of the scan signal does not overlap the enabled period of the first sensing signal.

According to an embodiment of the present invention, the amplitude of the first sensing signal is adjustable.

According to an embodiment of the present invention, the second sensing signal is enabled once during the turned-off period of the backlight module, and the enabled period of the second sensing signal overlaps the enabled period of the first sensing signal.

According to an embodiment of the present invention, the turned-on period and the turned-off period of the backlight module form a frame period.

According to an embodiment of the present invention, the proportion between the turned-on period and the turned-off period of the backlight module is 1:1.

The present invention also provides an optical reflective touch panel having the pixels described above.

The present invention further provides an optical reflective touch panel system having the optical reflective touch panel described above.

According to the present invention, a sensing circuit is directly disposed in a pixel of an optical reflective touch panel, and the sensitization state of the pixel is respectively sensed during a turned-on period and a turned-off period of a backlight module to output a digital signal, so as to notify an optical reflective touch panel system that whether the pixel is touched or not. Thereby, the optical reflective touch panel system can accurately detect any position touched by a user on the optical reflective touch panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
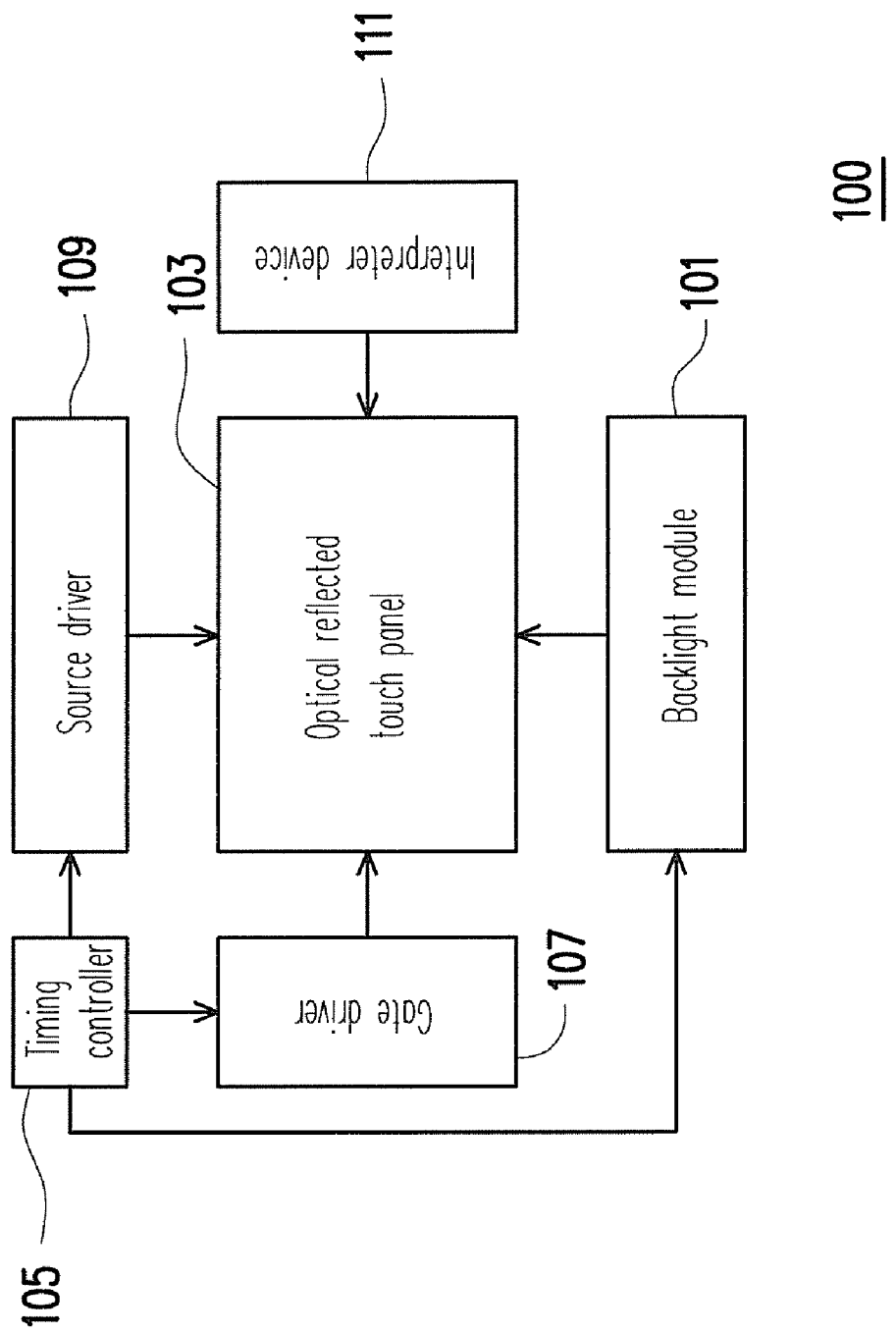
FIG. 1 is a block diagram of an optical reflective touch panel system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The technique provided by the present invention allows an optical reflective touch panel system to accurately detect any position touched by a user on an optical reflective touch panel. Below, the characteristics and advantages of the technique in the present invention will be described in detail.

Figure 2:
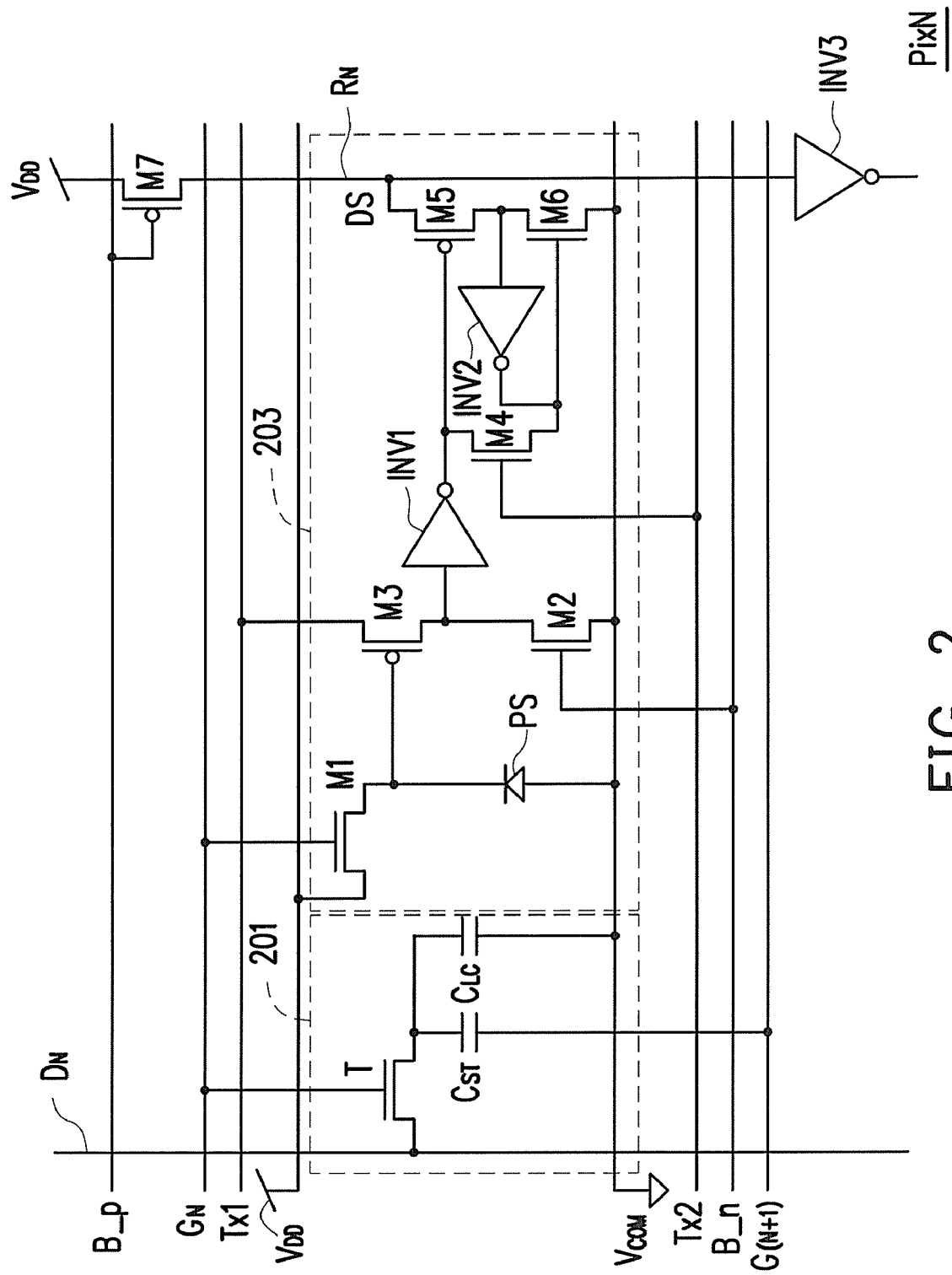
FIG. 2 is a circuit diagram of a pixel in an optical reflective touch panel according to an embodiment of the present invention.

FIG. 1 is a block diagram of an optical reflective touch panel system according to an embodiment of the present invention. FIG. 2 is a circuit diagram of a pixel in an optical reflective touch panel according to an embodiment of the present invention. Referring to FIG. 1 and FIG. 2, the optical reflective touch panel system includes a backlight module 101, an optical reflective touch panel 103, a timing controller 105, a gate driver 107, a source driver 109, and an interpreter device 111. In the present embodiment, the backlight module 101 is controlled by the timing controller 105 and used for providing a backlight source to the optical reflective touch panel 103.

The optical reflective touch panel 103 has a plurality of pixels arranged as an array, a plurality of horizontal scan lines, a plurality of vertical data lines, and a plurality of vertical readout lines. In order to describe the connections between all the pixels, scan lines, data lines, and readout lines clearly, an $N^{th}$ pixel PixN (N is a positive integer) will be described below as an example, and those skilled in the art should be able to understand the structure of the entire optical reflective touch panel 103 accordingly.

As shown in FIG. 2, the pixel PixN includes a display circuit 201 and a sensing circuit 203. The display circuit 201 is disposed at the junction of the $N^{th}$ scan line $G_N$ and the $N^{th}$ data line $D_N$ for controlling the display of the pixel. The display circuit 201 includes an active device T (for example, a thin film transistor-TFT), a storage capacitor $C_{ST}$, and a liquid crystal capacitor $C_{LC}$. The gate of the active device T is coupled to the $N^{th}$ scan line $G_N$, and the source of the active device T is coupled to the $N^{th}$ data line $D_N$.

One terminal of the storage capacitor $C_{ST}$ is coupled to the drain of the active device T, and the other terminal of the storage capacitor $C_{ST}$ is coupled to the $(N+1)^{th}$ scan line $G_{(N+1)}$. Namely, the design of Cs on gate is adopted; however, the design of Cs on common (the storage capacitor $C_{ST}$ is located on a common electrode) may also be adopted. One terminal of the liquid crystal capacitor $C_{LC}$ is coupled to the drain of the active device T, and the other terminal of the liquid crystal capacitor $C_{LC}$ is coupled to a common voltage $V_{COM}$.

The timing controller 105 provides control signals to the gate driver 107, the source driver 109, and the backlight module 101 to control the display circuits 201 of all the pixels in the optical reflective touch panel 103 to display images. Such a technique is well understood by those having ordinary knowledge in the art therefore will not be described herein.

The sensing circuit 203 is coupled to the display circuit 201 for respectively sensing the sensitization state of the pixel PixN during a turned-on period and a turned-off period of the backlight module 101 and outputting a digital signal DS to the $N^{th}$ readout line $R_N$ to notify the optical reflective touch panel system that whether the pixel PixN is touched or not. In the present embodiment, the sensing circuit 203 includes transistors M1~M6, a photosensitive device PS (for example, a photo sensor), and inverters INV1 and INV2.

The gate of the transistor M1 is coupled to the $N^{th}$ scan line $G_N$ for receiving a scan signal, and the first source or drain of the transistor M1 is coupled to a system voltage $V_{DD}$. One terminal of the photosensitive device PS is coupled to the second source or drain of the transistor M1, and the other terminal of the photosensitive device PS is coupled to the common voltage $V_{COM}$.

The gate of the transistor M2 receives a bias voltage B_n, and the first source or drain of the transistor M2 is coupled to the common voltage $V_{COM}$. The gate of the transistor M3 is coupled to the second source or drain of the transistor M1, the first source or drain of the transistor M3 receives a first sensing signal Tx1, and the second source or drain of the transistor M3 is coupled to the second source or drain of the transistor M2.

The input terminal of the inverter INV1 is coupled to the second source or drain of the transistor M3. The gate of the transistor M4 receives a second sensing signal Tx2, and the first source or drain of the transistor M4 is coupled to the output terminal of the inverter INV1. The gate of the transistor M5 is coupled to the output terminal of the inverter INV1, and the first source or drain of the transistor M5 outputs the digital signal DS to the $N^{th}$ readout line $R_N$.

The input terminal of the inverter INV2 is coupled to the second source or drain of the transistor M5, and the output terminal of the inverter INV2 is coupled to the second source or drain of the transistor M4. The gate of the transistor M6 is coupled to the output terminal of the inverter INV2, the first source or drain of the transistor M6 is coupled to the input terminal of the inverter INV2, and the second source or drain of the transistor M6 is coupled to the common voltage $V_{COM}$.

In the present embodiment, the transistors M1, M2, M4, and M6 are NMOS transistors, and the transistors M3 and M5 are PMOS transistors.

One terminal of the $N^{th}$ readout line $R_N$ is coupled to the first source or drain of a PMOS transistor M7, and the other terminal of the $N^{th}$ readout line $R_N$ is coupled to the input terminal of an inverter INV3. The second source or drain of the PMOS transistor M7 is coupled to the system voltage $V_{DD}$, the gate of the PMOS transistor M7 is coupled to the bias voltage B_p, and the output terminal of the inverter INV3 is coupled to the interpreter device 111.

Figure 3:
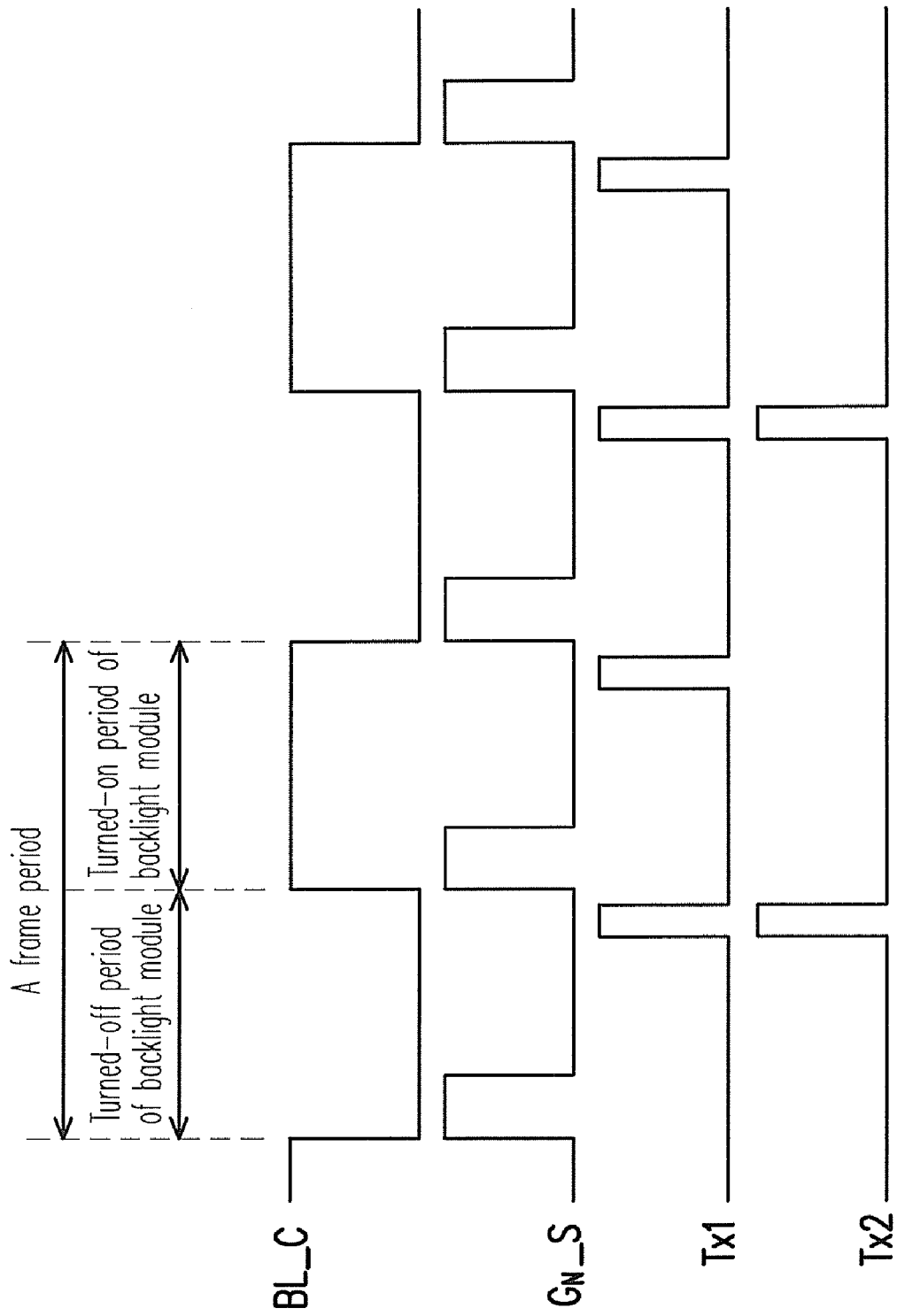
FIG. 3 is a partial operation timing diagram of a sensing circuit according to an embodiment of the present invention.

FIG. 3 is a partial operation timing diagram of a sensing circuit according to an embodiment of the present invention. Referring to FIGS. 1 to 3, all the operation timings illustrated in FIG. 3 include the control timing BL_C of the backlight module 101, the scan signal GN_S received by the $N^{th}$ scan line $G_N$, the first sensing signal Tx1, and the second sensing signal Tx2. The control timing BL_C, the first sensing signal Tx1, and the second sensing signal Tx2 can all be provided by the timing controller 105, and the turned-on period and turned-off period of the backlight module 101 form a frame period.

In the present embodiment, when the $N_{th}$ scan line $G_N$ receives the enabled scan signal $G_{N\_S}$ during the turned-off period of the backlight module 101, the transistor M1 is in a turned-on state and accordingly the photosensitive device PS is reset because of the system voltage $V_{DD}$. Herein regardless of the intensity of the ambient light source of the optical reflective touch panel 103, the photocurrent generated by the photosensitive device PS causes the transistor M3 to be in a turned-off state, and the transistor M2 remains in the turned-on state because of the bias voltage B_n. Thus, the output terminal of the inverter INV1 constantly outputs logic "1", so that when the first sensing signal Tx1 and the second sensing signal Tx2 are enabled, the transistor M4 is turned on and accordingly the transistors M5 and M6 are respectively in the turned-off state and the turned-on state.

Thereafter, when the $N^{th}$ scan line $G_N$ receives the enabled scan signal $G_{N\_S}$ during the turned-on period of the backlight module 101, the transistor M1 is still in the turned-on state so that the photosensitive device PS is reset again because of the system voltage $V_{DD}$. Herein regardless of the intensity of the ambient light source of the optical reflective touch panel 103, the photocurrent generated by the photosensitive device PS causes the transistor M3 to be in the turned-off state and the transistor M2 remains in the turned-on state because of the bias voltage B_n since no backlight source is reflected to the photosensitive device PS.

Thus, the output terminal of the inverter INV1 still outputs logic "1" constantly, and since the second sensing signal Tx2 is always in a dissipation state during the turned-on period of the backlight module 101, the transistors M5 and M6 still remain in the turned-off state and the turned-on state respectively. Because the transistor M5 is not turned on, the logic level on the readout line $R_N$ is the system voltage $V_{DD}$, and accordingly the output terminal of the inverter INV3 outputs logic "0".

However, when the backlight source is reflected to the photosensitive device PS during the turned-on period of the backlight module 101, the photocurrent generated by the photosensitive device PS causes the transistor M3 to be in the turned-on state, and the transistor M2 remains in the turned-on state because of the bias voltage B_n. Thus, the output terminal of the inverter INV1 constantly outputs logic "1" before the first sensing signal Tx1 is enabled, so that when the first sensing signal Tx1 is enabled, because the second sensing signal Tx2 is always in the dissipation state during the turned-on period of the backlight module 101, the transistors M5 and M6 are both in the turned-on state. Since the transistors M5 and M6 are both in the turned-on state, the logic level on the readout line $R_N$ is the common voltage $V_{COM}$, and accordingly the output terminal of the inverter INV3 outputs logic "1".

Preferably, in the present embodiment, the proportion between the turned-on period and the turned-off period of the backlight module 101 is 1:1. In addition, the scan signal $G_{N\_S}$ and the first sensing signal Tx1 are respectively enabled once during the turned-on period and the turned-off period of the backlight module 101, but the enabled period of the scan signal $G_{N\_S}$ cannot overlap the enabled period of the first sensing signal Tx1 (as shown in FIG. 3). Moreover, the second sensing signal Tx2 is enabled once during the turned-off period of the backlight module 101, and the enabled period of the second sensing signal Tx2 overlaps the enabled period of the first sensing signal Tx1 (as shown in FIG. 3).

Herein, it is assumed that the pixel PixN is touched when the optical reflective touch panel system determines through the interpretation of the interpreter device 111 that the signal output by the output terminal of the inverter INV3 is logic "1" and the pixel PixN is not touched otherwise. Based on this assumption, in the present embodiment, the sensing circuit 203 respectively determines the state (i.e., either logic "0" or logic "1") of the digital signal DS during the turned-on period and the turned-off period of the backlight module 101 according to the sensitization state of the photosensitive device PS. When the sensitization states of the photosensitive device PS during the turned-on period and the turned-off period of the backlight module 101 are the same (i.e., no backlight source is reflected to the photosensitive device PS), the state of the digital signal DS output by the sensing circuit 203 is logic "1"; otherwise, when the sensitization states of the photosensitive device PS during the turned-on period and the turned-off period of the backlight module 101 are different (i.e., the backlight source is reflected to the photosensitive device PS), the state of the digital signal DS output by the sensing circuit 203 is logic "0".

Thus, when the state of the digital signal DS output by the sensing circuit 203 is logic "1", the optical reflective touch panel system can get to know instantly that the pixel PixN is not touched after it interprets through the interpreter device 111 that the signal output by the output terminal of the inverter INV3 is logic ""; otherwise, when the state of the digital signal DS output by the sensing circuit 203 is logic "0", the optical reflective touch panel system can get to know instantly that the pixel PixN is touched after it interprets through the interpreter device 111 that the signal output by the output terminal of the inverter INV3 is logic "1".

As described above, in the present embodiment, the sensing circuit 203 determines the state of the digital signal DS according to the sensitization state of the photosensitive device PS during respectively the turned-on period and the turned-off period of the backlight module 101 in order to completely eliminate the affection of the ambient light source to the optical reflective touch panel 103. Thereby, the optical reflective touch panel system can accurately determine any position touched by a user on the optical reflective touch panel 103 without executing any meaningless operation.

FIGS. 4 to 7 respectively illustrate an experimental waveform of a sensing circuit according to an embodiment of the present invention. Referring to FIGS. 1 to 7, all the experimental waveforms illustrated in FIGS. 4 to 7 include the waveform of the sensitization state of the photosensitive device PS, the waveform of the scan signal $G_{N\_S}$, the waveform of the digital signal DS output by the sensing circuit 203, and the waveform of the signal output by the output terminal of the inverter INV3.

Figure 4:
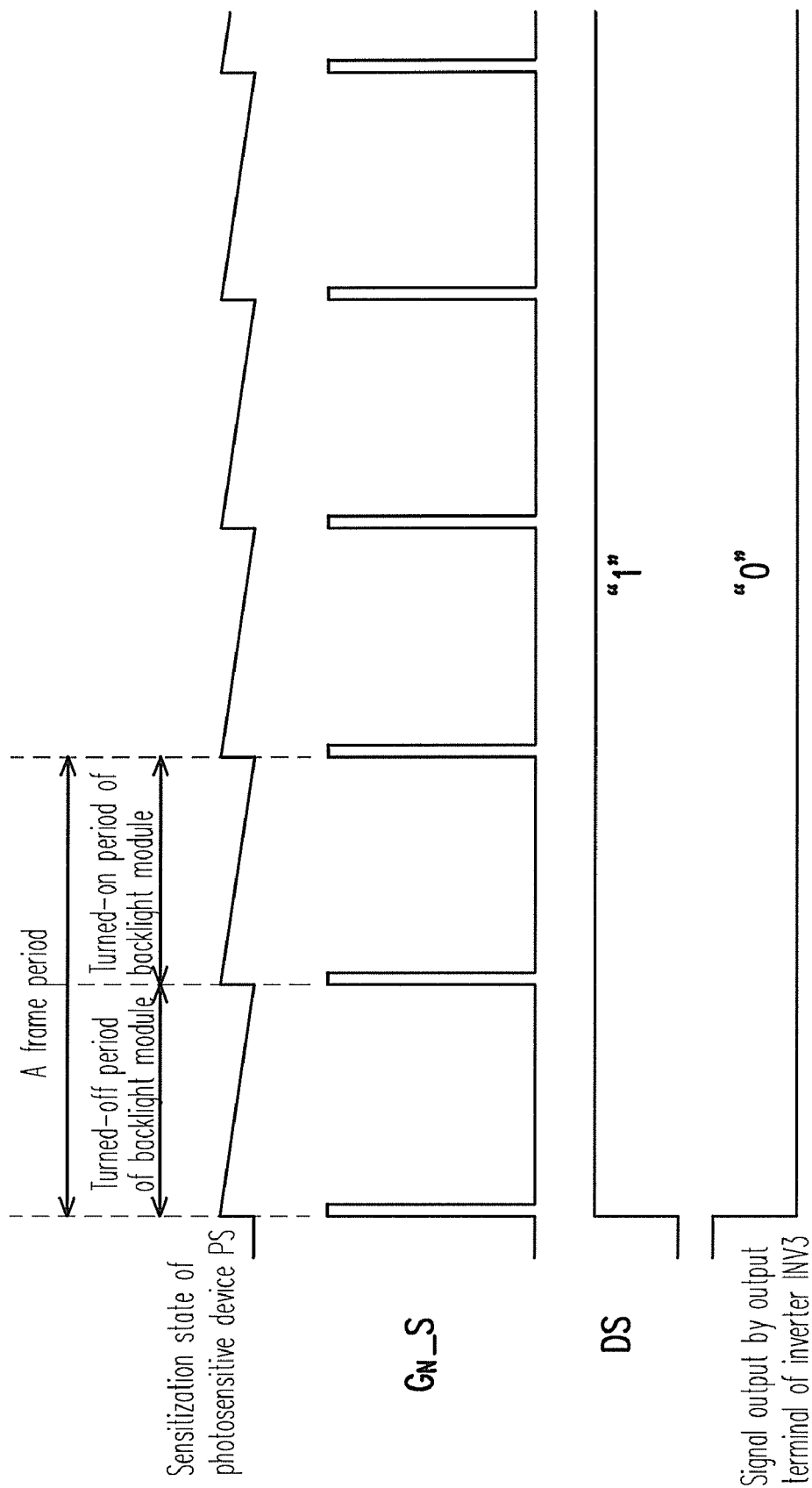
FIGS. 4~7 respectively illustrate an experimental waveform of a sensing circuit according to an embodiment of the present invention.
Figure 5:
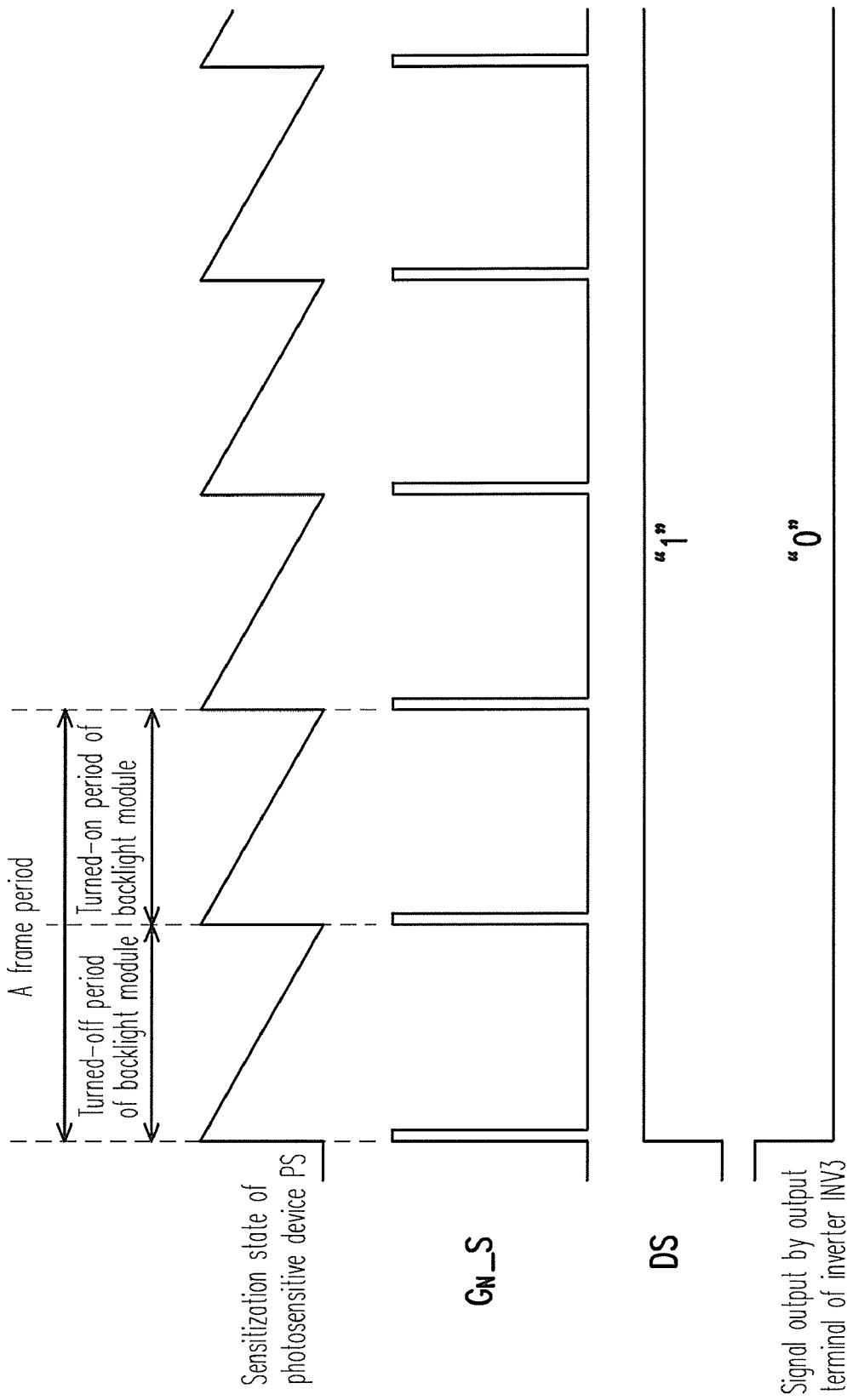

It can be easily understood from FIG. 4 and FIG. 5 that the sensitization states of the photosensitive device PS during the turned-on period and the turned-off period of the backlight module 101 are the same (because no backlight source is reflected to the photosensitive device PS), the state of the digital signal DS output by the sensing circuit 203 is logic "1" and the state of the signal output by the output terminal of the inverter INV3 is logic "0". Thus, the optical reflective touch panel system gets to know that the pixel PixN is not touched after it interprets the state (i.e., logic "0") of the signal output by the output terminal of the inverter INV3 through the interpreter device 111.

Figure 6:
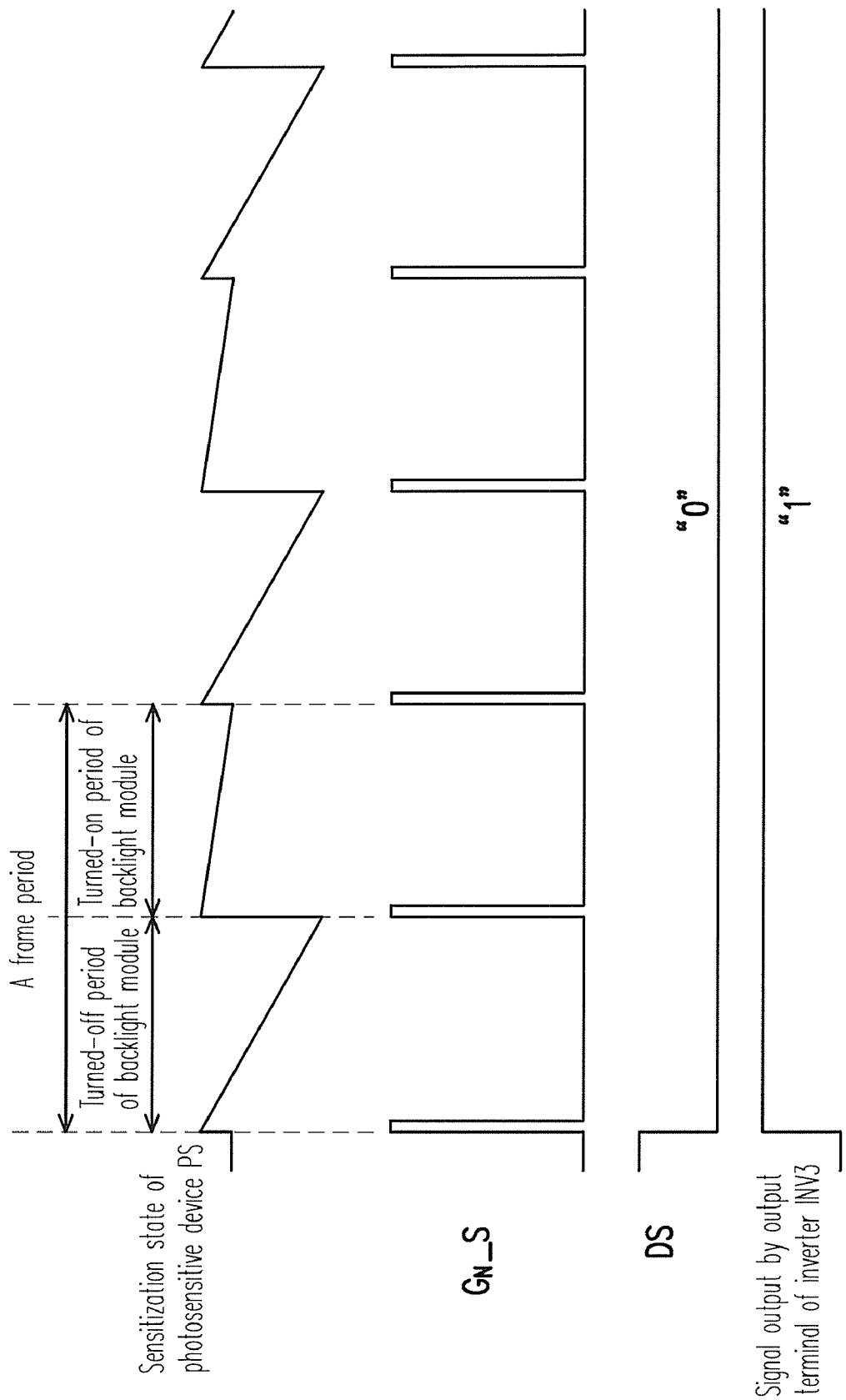
Figure 7:
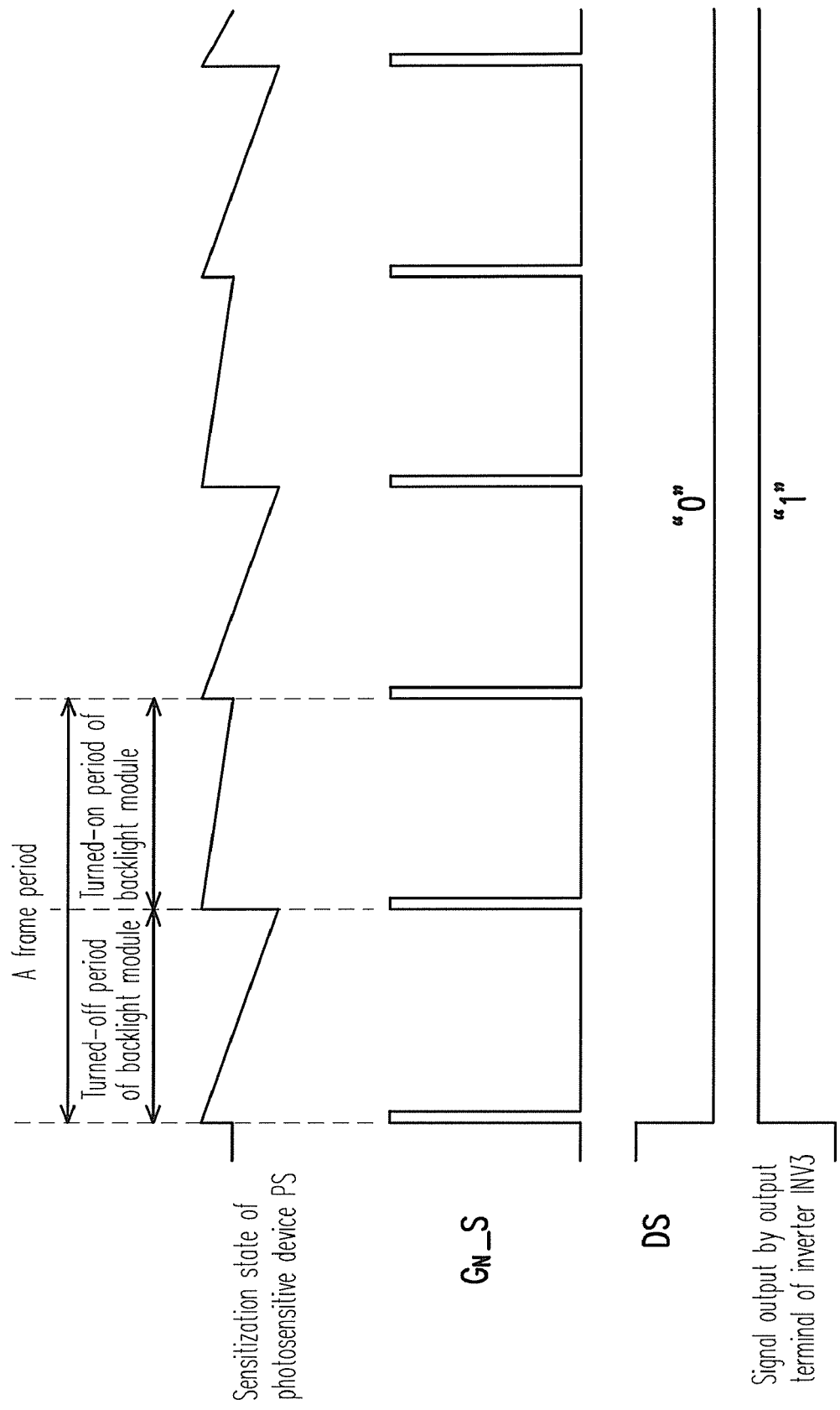

Similarly, as shown in FIG. 6 and FIG. 7, the sensitization states of the photosensitive device PS during the turned-on period and the turned-off period of the backlight module 101 are different (because the backlight source is reflected to the photosensitive device PS), the state of the digital signal DS output by the sensing circuit 203 is logic "0", and the state of the signal output by the output terminal of the inverter INV3 is logic "1". Thus, the optical reflective touch panel system gets to know that the pixel PixN is touched after it interprets the state (i.e., logic "1") of the signal output by the output terminal of the inverter INV3 through the interpreter device 111.

However, in an actual application, when the sensitization state of the photosensitive device PS when it receives a reflected backlight source is approximately the same as the sensitization state thereof when it does not receive any reflected backlight source (i.e., there is only ambient light source), the state of the digital signal DS output by the sensing circuit 203 may be incorrect. Namely, the original state of the digital signal DS should be logic "1" but it is output as logic "0" instead. As a result, the optical reflective touch panel system may interpret incorrectly.

Thus, in the present embodiment, the amplitude of the first sensing signal Tx1 is designed to be adjustable so that when the sensitization state of the photosensitive device PS when it receives the reflected backlight source is approximately the same as the sensitization state of the photosensitive device PS when it does not receive any reflected backlight source, the sensing circuit 203 is prevented from outputting the digital signal DS of incorrect state by simply increasing the amplitude of the first sensing signal Tx1 (according to the actual situation). Thereby, the sensing circuit 203 is made adaptive to various operation environments by designing the amplitude of the first sensing signal Tx1 to be adjustable.

It is within the scope of the present invention as long as the sensitization state of any pixel in the optical reflective touch panel is sensed during a turned-on period and a turned-off period of a backlight module and an optical reflective touch panel system is notified about whether the pixel is touched or not by issuing a digital signal.

In overview, according to the present invention, a sensing circuit is directly disposed in each pixel of an optical reflective touch panel, and the sensitization state of the pixel is respectively sensed during the turned-on period and the turned-off period of a backlight module, so as to notify a optical reflective touch panel system that whether the pixel is touched or not by outputting a digital signal. Thereby, the optical reflective touch panel system can accurately detect any position touched by a user on the optical reflective touch panel without executing any meaningless operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel of an optical reflective touch panel, comprising:
   a display circuit coupled to an $N^{th}$ scan line and an $N^{th}$ data line for controlling the display of the pixel; and
   a sensing circuit coupled to the display circuit for respectively sensing a sensitization state of the pixel in response to a scan signal received by the $N^{th}$ scan line, a first sensing signal and a second sensing signal during a turned-on period and a turned-off period of a backlight module and outputting a digital signal to notify an optical reflective touch panel system that whether the pixel is touched or not,
   wherein the scan signal and the first sensing signal are respectively enabled once during the turned-on period and the turned-off period of the backlight module, and the enabled period of the scan signal does not overlap the enabled period of the first sensing signal,
   wherein the second sensing signal is enabled once during the turned-off period of the backlight module, and the enabled period of the second sensing signal overlaps the enabled period of the first sensing signal.

2. The pixel according to claim 1, wherein the display circuit comprises:
   an active device having a gate coupled to the $N^{th}$ scan line and a source coupled to the $N^{th}$ data line, wherein N is a positive integer;
   a storage capacitor having one terminal coupled to a drain of the active device and the other teiminal coupled to an $(N+1)^{th}$ scan line; and
   a liquid crystal capacitor having one terminal coupled to the drain of the active device and the other terminal coupled to a common voltage.

3. The pixel according to claim 2, wherein the sensing circuit comprises:
   a first transistor having a gate coupled to the $N^{th}$ scan line for receiving the scan signal and a first source or drain coupled to a system voltage;
   a photosensitive device having one terminal coupled to a second source or drain of the first transistor and the other terminal coupled to the common voltage;
   a second transistor having a gate for receiving a bias voltage and a first source or drain coupled to the common voltage;
   a third transistor having a gate coupled to the second source or drain of the first transistor, a first source or drain for receiving the first sensing signal, and a second source or drain coupled to a second source or drain of the second transistor;
   a first inverter having an input terminal coupled to the second source or drain of the third transistor;
   a fourth transistor having a gate for receiving the second sensing signal and a first source or drain coupled to an output terminal of the first inverter;
   a fifth transistor having a gate coupled to the output terminal of the first inverter and a first source or drain for outputting the digital signal to an $N^{th}$ readout line;
   a second inverter having an input terminal coupled to a second source or drain of the fifth transistor and an output terminal coupled to a second source or drain of the fourth transistor; and
   a sixth transistor having a gate coupled to the output terminal of the second inverter, a first source or drain coupled to the output terminal of the second inverter, and a second source or drain coupled to the common voltage.

4. The pixel according to claim 3, wherein the first transistor, the second transistor, the fourth transistor, and the sixth transistor are NMOS transistors, and the third transistor and the fifth transistor are PMOS transistors.

5. The pixel according to claim 1, wherein the amplitude of the first sensing signal is adjustable.

6. The pixel according to claim 1, wherein the turned-on period and the turned-off period of the backlight module form a frame period.

7. The pixel according to claim 6, wherein the proportion between the turned-on period and the turned-off period of the backlight module is 1:1.

8. An optical reflective touch panel, at least comprising:
an $N^{th}$ scan line, wherein N is a positive integer;
an $N^{th}$ data line;
an $N^{th}$ readout line; and
a pixel comprising:
   a display circuit disposed at the junction of the $N^{th}$ scan line and the $N^{th}$ data line, and coupled to the $N^{th}$ scan line and the $N^{th}$ data line for controlling the display of the pixel; and
   a sensing circuit coupled to the display circuit for sensing a sensitization state of the pixel in response to a scan signal received by the $N^{th}$ scan line, a first sensing signal and a second sensing signal during a turned-on period and a turned-off period of a backlight module and outputting a digital signal to the $N^{th}$ readout line to notify an optical reflective touch panel system that whether the pixel is touched or not,
wherein the scan signal and the first sensing signal are respectively enabled once during the turned-on period and the turned-off period of the backlight module, and the enabled period of the scan signal does not overlap the enabled period of the first sensing signal,
wherein the second sensing signal is enabled once during the turned-off period of the backlight module, and the enabled period of the second sensing signal overlaps the enabled period of the first sensing signal.

9. The optical reflective touch panel according to claim 8, wherein the display circuit comprises:
an active device having a gate coupled to the $N^{th}$ scan line and a source coupled to the $N^{th}$ data line;
a storage capacitor having one terminal coupled to a drain of the active device and the other terminal coupled to an $(N+1)^{th}$ scan line; and
a liquid crystal capacitor having one terminal coupled to the drain of the active device and the other terminal coupled to a common voltage.

10. The optical reflective touch panel according to claim 9, wherein the sensing circuit comprises:
a first transistor having a gate coupled to the $N^{th}$ scan line for receiving the scan signal and a first source or drain coupled to a system voltage;
a photosensitive device having one terminal coupled to a second source or drain of the first transistor and the other terminal coupled to the common voltage;
a second transistor having a gate for receiving a bias voltage and a first source or drain coupled to the common voltage;
a third transistor having a gate coupled to the second source or drain of the first transistor, a first source or drain for receiving the first sensing signal, and a second source or drain coupled to a second source or drain of the second transistor;
a first inverter having an input terminal coupled to the second source or drain of the third transistor;
a fourth transistor having a gate for receiving the second sensing signal and a first source or drain coupled to an output terminal of the first inverter;
a fifth transistor having a gate coupled to the output terminal of the first inverter and a first source or drain for outputting the digital signal to the $N^{th}$ readout line;
a second inverter having an input terminal coupled to a second source or drain of the fifth transistor and an output terminal coupled to a second source or drain of the fourth transistor; and
a sixth transistor having a gate coupled to the output terminal of the second inverter, a first source or drain coupled to the input terminal of the second inverter, and a second source or drain coupled to the common voltage.

11. The optical reflective touch panel according to claim 10, wherein the first transistor, the second transistor, the fourth transistor, and the sixth transistor are NMOS transistors, and the third transistor and the fifth transistor are PMOS transistors.

12. The optical reflective touch panel according to claim 8, wherein the amplitude of the first sensing signal is adjustable.

13. The optical reflective touch panel according to claim 8, wherein the turned-on period and the turned-off period of the backlight module form a frame period.

14. The optical reflective touch panel according to claim 13, wherein the proportion between the turned-on period and the turned-off period of the backlight module is 1:1.

15. An optical reflective touch panel system, comprising:
a backlight module; and
an optical reflective touch panel comprising at least an $N^{th}$ scan line, an $N^{th}$ data line, an $N^{th}$ readout line, and a pixel, wherein N is a positive integer, and the pixel comprises:
   a display circuit disposed at the junction of the $N^{th}$ scan line and the $N^{th}$ data line, and coupled to the $N^{th}$ scan line and the $N^{th}$ data line for controlling the display of the pixel; and
   a sensing circuit coupled to the display circuit for sensing a sensitization state of the pixel in response to a scan signal received by the $N^{th}$ scan lines, a first sensing signal and a second sensing signal during a turned-on period and a turned-off period of the backlight module and outputting a digital signal to the $N^{th}$ readout line to notify the optical reflective touch panel system that whether the pixel is touched or not,
wherein the scan signal and the first sensing signal are respectively enabled once during the turned-on period and the turned-off period of the backlight module, and the enabled period of the scan signal does not overlap the enabled period of the first sensing signal,
wherein the second sensing signal is enabled once during the turned-off period of the backlight module, and the enabled period of the second sensing signal overlaps the enabled period of the first sensing signal.

16. The optical reflective touch panel system according to claim 15, wherein the display circuit comprises:
an active device having a gate coupled to the $N^{th}$ scan line and a source coupled to the $N^{th}$ data line;
a storage capacitor having one terminal coupled to a drain of the active device and the other terminal coupled to an $(N+1)^{th}$ scan line; and
a liquid crystal capacitor having one terminal coupled to the drain of the active device and the other terminal coupled to a common voltage.

17. The optical reflective touch panel system according to claim 16, wherein the sensing circuit comprises:
- a first transistor having a gate coupled to the $N^{th}$ scan line for receiving the scan signal and a first source or drain coupled to a system voltage;
- a photosensitive device having one terminal coupled to a second source or drain of the first transistor and the other terminal coupled to the common voltage;
- a second transistor having a gate for receiving a bias voltage and a first source or drain coupled to the common voltage;
- a third transistor having a gate coupled to the second source or drain of the first transistor, a first source or drain for receiving the first sensing signal, and a second source or drain coupled to a second source or drain of the second transistor;
- a first inverter having an input terminal coupled to the second source or drain of the third transistor;
- a fourth transistor having a gate for receiving the second sensing signal and a first source or drain coupled to an output terminal of the first inverter;
- a fifth transistor having a gate coupled to the output terminal of the first inverter and a first source or drain for outputting the digital signal to the $N^{th}$ readout line;
- a second inverter, having an input terminal coupled to a second source or drain of the fifth transistor and an output terminal coupled to a second source or drain of the fourth transistor; and
- a sixth transistor having a gate coupled to the output terminal of the second inverter, a first source or drain coupled to the input terminal of the second inverter, and a second source or drain coupled to the common voltage.

18. The optical reflective touch panel system according to claim 17, wherein the first transistor, the second transistor, the fourth transistor, and the sixth transistor are NMOS transistors, and the third transistor and the fifth transistor are PMOS transistors.

19. The optical reflective touch panel system according to claim 15, wherein the amplitude of the first sensing signal is adjustable.

20. The optical reflective touch panel system according to claim 15, wherein the turned-on period and the turned-off period of the backlight module form a frame period.

21. The optical reflective touch panel system according to claim 20, wherein the proportion between the turned-on period and the turned-off period of the backlight module is 1:1.

* * * * *